(12) United States Patent
Neitzell

(10) Patent No.: US 8,221,037 B2
(45) Date of Patent: Jul. 17, 2012

(54) CUTTING TOOL

(75) Inventor: Roger D. Neitzell, Palmyra, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 911 days.

(21) Appl. No.: 12/186,621

(22) Filed: Aug. 6, 2008

(65) Prior Publication Data

US 2009/0044674 A1 Feb. 19, 2009

Related U.S. Application Data

(60) Provisional application No. 60/955,427, filed on Aug. 13, 2007.

(51) Int. Cl.
*B23B 51/04* (2006.01)

(52) U.S. Cl. .......................... 408/204; 408/1 R; 408/206

(58) Field of Classification Search .......... 408/204–209, 408/703, 1 R; *B23B 51/04, 51/05*
See application file for complete search history.

(56) References Cited

U.S. PATENT DOCUMENTS

| | | | | |
|---|---|---|---|---|
| 72,436 | A | * | 12/1867 | Wippo ........................ 408/189 |
| 475,560 | A | * | 5/1892 | Heydenreich .................. 408/26 |
| 1,115,010 | A | * | 10/1914 | Patrosio ........................ 409/192 |
| 1,994,516 | A | * | 3/1935 | Hawn ............................. 408/56 |
| 2,444,099 | A | | 6/1948 | Hennessey, Jr. |
| 2,482,439 | A | * | 9/1949 | Smith ........................... 408/161 |
| 2,496,939 | A | * | 2/1950 | Gonzalez ..................... 408/202 |
| 2,680,435 | A | * | 6/1954 | Gonzalez ....................... 408/56 |
| 2,779,361 | A | | 1/1957 | McKiff |
| 2,794,469 | A | | 6/1957 | Shorten |
| 3,262,474 | A | | 7/1966 | Enders |
| 3,390,596 | A | | 7/1968 | Trevathan |
| 3,430,526 | A | | 3/1969 | Valenziano |
| 3,609,056 | A | | 9/1971 | Hougen |
| 3,648,508 | A | | 3/1972 | Hougen |
| 3,920,350 | A | | 11/1975 | Southall |
| 3,966,349 | A | | 6/1976 | Osman et al. |
| 4,108,567 | A | | 8/1978 | Faber |
| 4,129,400 | A | | 12/1978 | Wozar |
| 4,149,821 | A | | 4/1979 | Faber |
| 4,255,828 | A | * | 3/1981 | Colla ........................ 15/236.01 |
| 4,322,187 | A | | 3/1982 | Hougen |
| 4,352,610 | A | | 10/1982 | Yankovoy et al. |

(Continued)

FOREIGN PATENT DOCUMENTS

DE 282475 8/1913

(Continued)

OTHER PUBLICATIONS

Great Britain Application No. 0814676.3 Examiner's Report dated Nov. 22, 2011, 5 pgs.

(Continued)

*Primary Examiner* — Daniel Howell
(74) *Attorney, Agent, or Firm* — Michael Best & Friedrich LLP

(57) ABSTRACT

A cutting tool for cutting a workpiece. The cutting tool can include a tool body having a first end and a second end and defining an axis extending through the first and second ends, a rim extending circumferentially around the first end of the tool body, and a blade having a base supported on the tool body for movement relative to the rim.

30 Claims, 8 Drawing Sheets

U.S. PATENT DOCUMENTS

| | | | |
|---|---|---|---|
| 4,406,334 A | | 9/1983 | Baumann et al. |
| 4,491,124 A | * | 1/1985 | Goettel .................. 126/293 |
| 4,591,303 A | | 5/1986 | Sato et al. |
| 4,693,644 A | | 9/1987 | Takahashi |
| 4,859,123 A | | 8/1989 | Koesashi et al. |
| 5,451,128 A | | 9/1995 | Hattersley |
| 5,597,274 A | | 1/1997 | Behner |
| 5,681,134 A | * | 10/1997 | Ebert ......................... 408/205 |
| 5,758,997 A | | 6/1998 | Mealey et al. |
| 5,803,677 A | | 9/1998 | Brutscher et al. |
| 5,813,802 A | | 9/1998 | Ajimi et al. |
| 5,934,845 A | | 8/1999 | Frey |
| 6,273,652 B1 | | 8/2001 | Wirth, Jr. et al. |
| 6,379,090 B1 | | 4/2002 | Halley et al. |
| 6,599,063 B1 | | 7/2003 | Capstran |
| 6,705,807 B1 | | 3/2004 | Rudolph et al. |
| 6,786,684 B1 | | 9/2004 | Ecker |
| 7,189,036 B1 | | 3/2007 | Watson |
| 7,637,703 B2 | * | 12/2009 | Khangar et al. ............ 408/204 |
| 2002/0106254 A1 | | 8/2002 | Rudolph |
| 2004/0042861 A1 | | 3/2004 | Capstran |

FOREIGN PATENT DOCUMENTS

| | | | |
|---|---|---|---|
| DE | 2553035 A1 | | 6/1977 |
| DE | 3248421 A | * | 6/1984 |
| EP | 0375526 A1 | | 6/1990 |
| GB | 2338804 A | | 11/2003 |
| JP | 07-237193 | | 2/1994 |
| JP | 09066411 A | | 3/1997 |
| JP | 09103906 A | | 4/1997 |
| JP | 2000107919 | | 10/1998 |
| JP | 11058116 A | | 3/1999 |
| JP | 11179720 A | | 7/1999 |
| RU | 2060116 C1 | * | 5/1996 |
| RU | 2063845 C1 | * | 7/1996 |

OTHER PUBLICATIONS

Second Office Action from the State Intellectual Property Office of the People's Republic of China Application No. 200810210646.7, dated Dec. 23, 2011 (10 pages).

* cited by examiner

CUTTING TOOL

The present invention claims the benefit of prior-filed, U.S. provisional patent application Ser. No. 60/955,427, filed Aug. 13, 2007, the entire contents of which is hereby incorporated by reference.

FIELD OF THE INVENTION

The present invention relates to cutting tools and, more particularly, to a rotary cutting tool for a power tool.

SUMMARY

In some embodiments, the present invention provides a cutting tool for cutting a workpiece. The cutting tool can include a tool body having a first end and a second end and defining an axis extending through the first and second ends, a rim extending circumferentially around the first end of the tool body, and a blade supported on the tool body for movement relative to the rim. In some embodiments, the blade is moveable radially relative to the rim to adjust a cutting path defined by the cutting tool.

The present invention also provides a method for cutting a workpiece with a cutting tool including a tool body having a first end and a second end and defining an axis extending through the first end and second end, a rim extending circumferentially around the first end of the tool body, and a blade supported on the rim for movement relative to the tool body. The method can include the acts of driving the cutting tool into the workpiece to cut a plug from the workpiece and moving the blade radially inwardly relative to the rim such that at least a portion of the outer perimeter of the plug is smaller than an inner diameter of the rim of the cutting tool.

In some embodiments, the present invention provides a cutting tool for cutting a workpiece. The cutting tool can include a tool body having a first end and a second end and defining an axis extending through the first and second ends, a rim extending circumferentially around the first end of the tool body, and a blade having a base supported on the tool body for movement relative to the rim.

In addition, the present invention provides a cutting tool for cutting a workpiece. The cutting tool can include a tool body having a first end and a second end and defining an axis extending through the first and second ends, a rim extending circumferentially around the first end of the tool body, a first portion of the tool body being moveable radially relative to a second portion of the tool body, and a blade supported on the first portion for movement with the first portion to define a cutting path having a circumference smaller than a circumference of a cutting path of the second portion of the tool body.

The present invention also provides a method of cutting a workpiece with a cutting tool, the cutting tool including a tool body. The method can include the acts of positioning a rim extending circumferentially around an end of the tool body adjacent to the workpiece, engaging a blade supported on the tool body with the workpiece, driving the cutting tool into the workpiece to cut the workpiece, and moving a base of the blade relative to the rim.

In some embodiments, the present invention provides a method of cutting a workpiece with a cutting tool, the cutting tool including a tool body having a first end and a second end and defining an axis extending through the first end and second end. The method can include the acts of positioning a rim extending circumferentially around the first end of the tool body adjacent to the workpiece, engaging a blade supported on the tool body with the workpiece, driving the cutting tool into the workpiece to cut a plug from the workpiece, and moving the blade and a first portion of the tool body radially outwardly relative to a second portion of the tool body.

Other aspects of the invention will become apparent by consideration of the detailed description and accompanying drawings.

DETAILED DESCRIPTION

Figure 1:
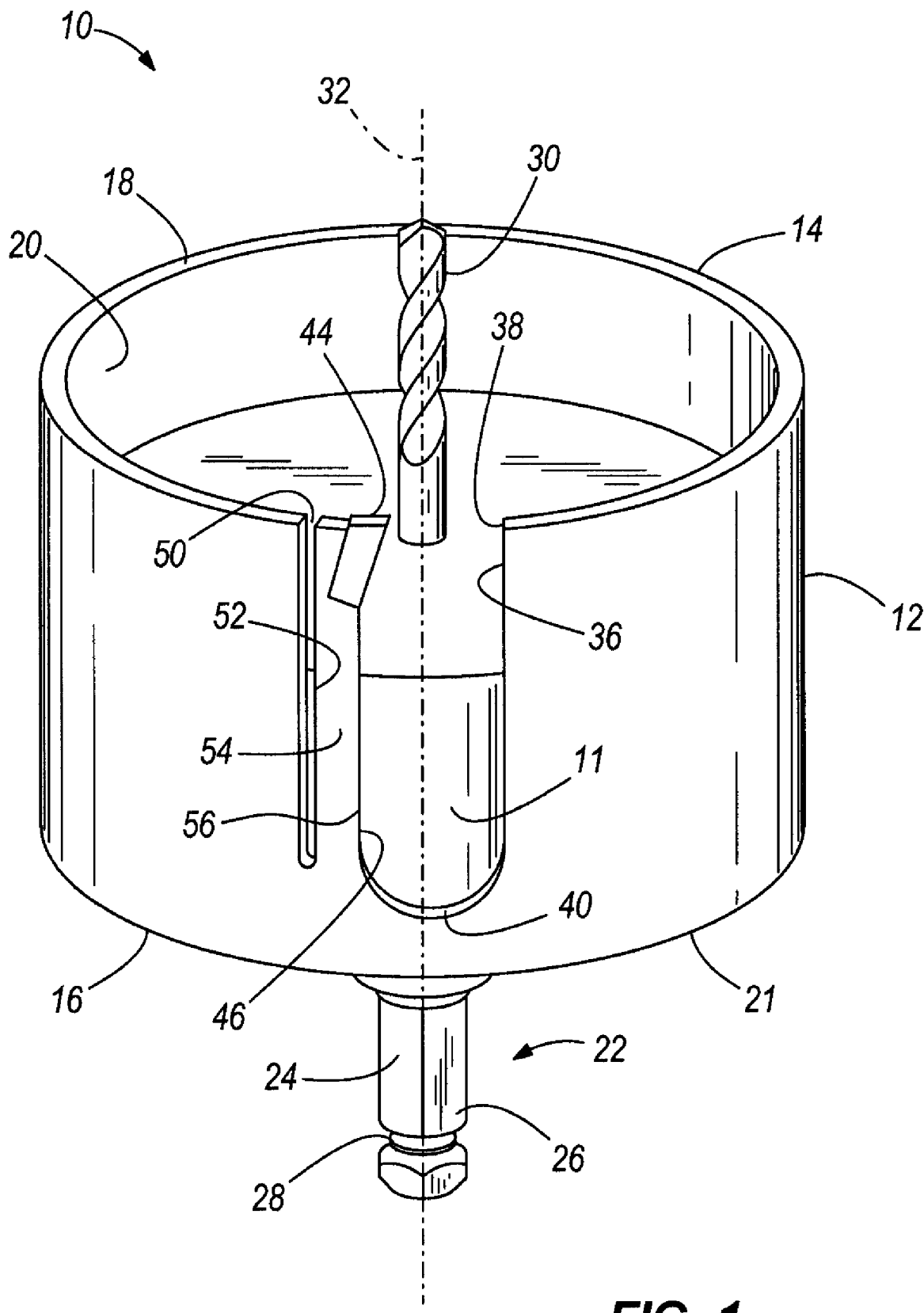
FIG. 1 is a front perspective view of a cutting tool according to some embodiments of the present invention and a plug supported in the cutting tool.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," and "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it is to be understood that phraseology and terminology used herein with reference to device or element orientation (such as, for example, terms like "front," "rear," "top," "bottom," "lower", "up," "down," etc.) are only used to simplify description of the present invention, and do not alone indicate or imply that the device or element referred to must have a particular orientation. The elements of the present invention can be installed and operated in any orientation desired. In addition, terms such as "first", "second," and "third" are used herein for purposes of description and are not intended to indicate or imply relative importance or significance.

FIGS. 1-7 illustrate a cutting tool 10, such as, for example, a hole-saw, for operation with a power tool (e.g., a drill, a driver-drill, a screwdriver, and the like). In some embodiments, the cutting tool 10 is operable to cut holes in a workpiece and/or to remove plugs 11 from the workpiece.

As shown in FIGS. 1-7, the cutting tool 10 includes a generally cylindrically-shaped body 12 having a first or workpiece-engaging end 14 and a second or rearward end 16. The first end includes a rim 18 defining an opening 20 and the second end 16 includes a base 21.

A connecting structure 22 is supported on the second end 16 of the body 12 and includes an elongated rearwardly-extending drive shaft 24 configured to be received in a chuck or spindle of a power tool. For example, the connecting structure 22 may be received by a spindle of a power tool. In some embodiments, such as the illustrated embodiment of FIGS. 1-7, fasteners can be used to secure the connecting structure 22 to the body 12 of the cutting tool 10. In other embodiments, the body 12 and the connecting structure 22 can be integrally formed.

Figure 2:
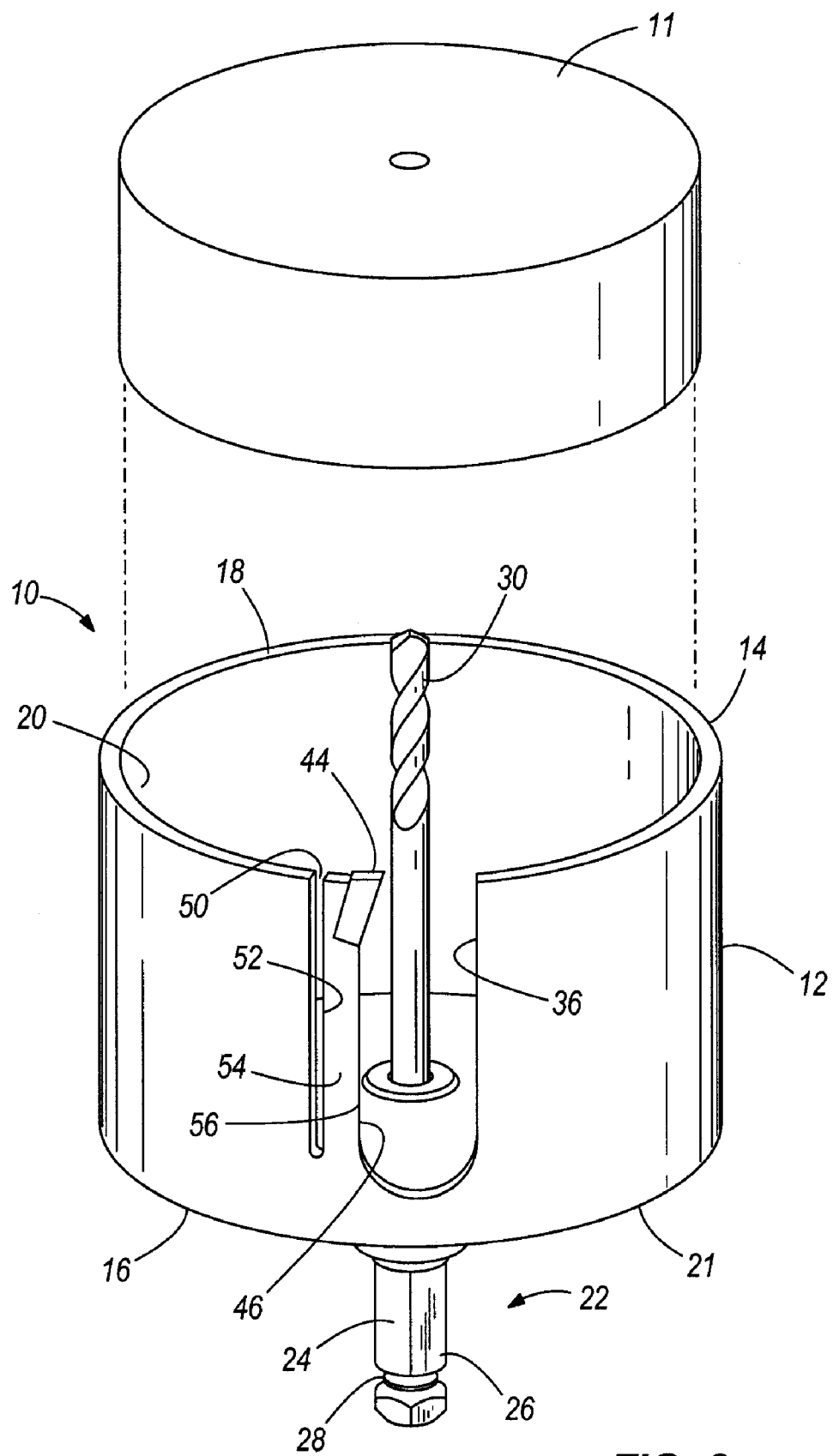
FIG. 2 is another front perspective view of the cutting tool shown in FIG. 1 with the plug removed from the cutting tool.
Figure 3:
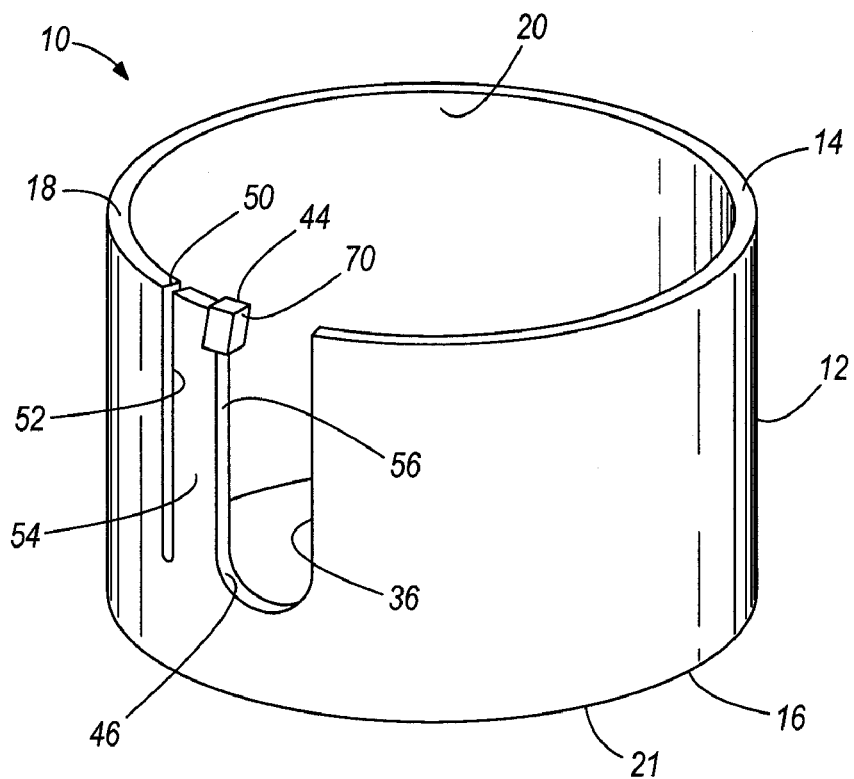
FIG. 3 is a perspective view of a portion of the cutting tool shown in FIG. 1.
Figure 4:
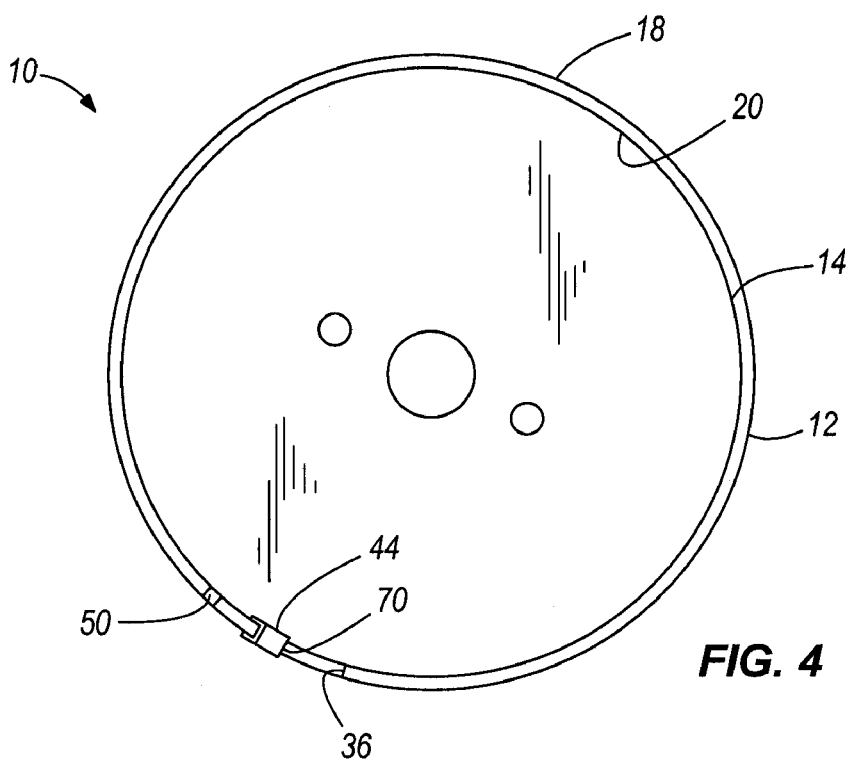
FIG. 4 is a front view of the cutting tool shown in FIG. 1.

In the illustrated embodiment of FIGS. 1 and 2, the drive shaft 24 has a substantially hexagonal cross-sectional shape and includes six flat sides 26. In other embodiments, the drive shaft 24 can have other cross-sectional shapes, such as, for example, round, triangular, rectangular, trapezoidal, or any other polygonal shape, oval, irregular, and the like and can include one or more flat sides 26.

In the illustrated embodiment of FIGS. 1 and 2, the connecting structure 22 also includes a groove 28 extending circumferentially around a rearward end of the drive shaft 24 for engagement with locking elements in a chuck or spindle of a power tool. In other embodiments, the connecting structure 22 can include other recesses and protrusions and combinations of recesses and protrusions for engagement with locking elements in chucks of power tools for securing the cutting tool 10 to the power tool.

In some embodiments, such as the illustrated embodiment of FIGS. 1 and 2, a bit 30 extends forwardly from the first end 14 of the body 12 and outwardly from the body 12 beyond the rim 18. In the illustrated embodiment of FIGS. 1 and 2, the bit 30 is configured as a twist drill bit and is generally aligned with the drive shaft 24 along a longitudinal axis 32. In other embodiments, the bit 30 and the drive shaft 24 can have other relative orientations and can have other configurations, such as, for example, a spade bit configuration, an auger bit configuration, etc.

As shown in FIGS. 1-7, an opening or gullet 36 can extend axially through the body 12 between the rim 18 and the base 21. For example, as shown in FIGS. 1-7, the gullet 36 can open through the rim 18 and can extend toward the base 21 through a majority of the length of the body 10. In other embodiments, the cutting tool 10 can include two, three, four, or more, gullets 36 arranged circumferentially around the body 12. In some such embodiments, the gullet(s) 36 can be similarly or differently configured and can open through the rim 18, stop short of the rim 18, be spaced circumferentially around the body 12 at regular or irregular intervals, extend through the body 12 in a direction substantially parallel to the axis 32, extend through the body 12 in a direction substantially normal to the axis 32, extend through the body 12 along an irregular path, extend through the body 12 in a direction at an angle relative to the axis 32, and extend toward the base 21 or stop short of the base 21.

In the illustrated embodiment of FIGS. 1-7, the gullet 36 includes an open first end 38 opening through the rim 18 and a closed second end 40. In the illustrated embodiment of FIGS. 1-7, the second end 40 of the gullet 36 is generally arcuately shaped and is positioned adjacent to the base 21 of the body 12. In other embodiments, such as those illustrated in FIGS. 8-12, the closed first ends 38 and second ends 40 of the gullets 36 can have any other shape desired, such as, for example, flat, sloped, angled, pointed, irregular, and the like and can be positioned at any location between the first and second ends 14, 16 of the body 12.

In the illustrated embodiment of FIGS. 1-7, a blade 44 is supported on the first end 14 of the body 12 adjacent to the gullet 36. In embodiments such as the illustrated embodiment in which the cutting tool 10 is rotated about the axis 32 in a counterclockwise direction, the blade 44 can be located adjacent to a trailing edge 46 of the gullet 36. In other embodiments, such as those illustrated in FIGS. 8-12, the cutting tool 10 can include two or more blades 44 positioned circumferentially around the rim 18 at regular or irregular intervals, adjacent to gullets 36, between a pair of gullets 36, or at any other location along the rim 18.

In the illustrated embodiments of FIGS. 1-7, a slot or opening 50 extends axially through the rim 18 of the cutting tool body 12 toward the second end 16, at least partially defining a trailing edge 52 of a moveable portion or wall 54. In other embodiments, the slot 50 extends through the rim 18 of the tool body 12 at an angle acute with respect to the axis 32. In some such embodiments, the configuration of the slot 50 is selected based upon one or more of the material used to form the tool body 12, the anticipated material of the workpiece, the material used to form the moveable wall 54 (which may or may not be different than the material used to form the tool body 12 or a portion of the tool body 12) the number and size of the blades 44 supported on the tool body 12, and the desired size of the plug 11 being cut from the workpiece.

Figure 5:
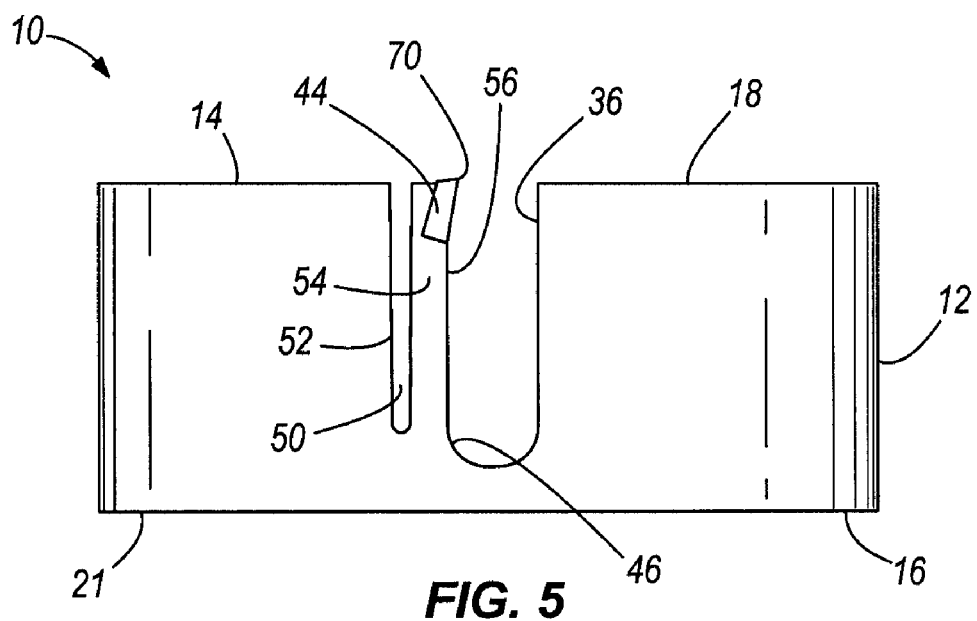
FIG. 5 is a side view of a portion of the cutting tool shown in FIG. 1.
Figure 6:
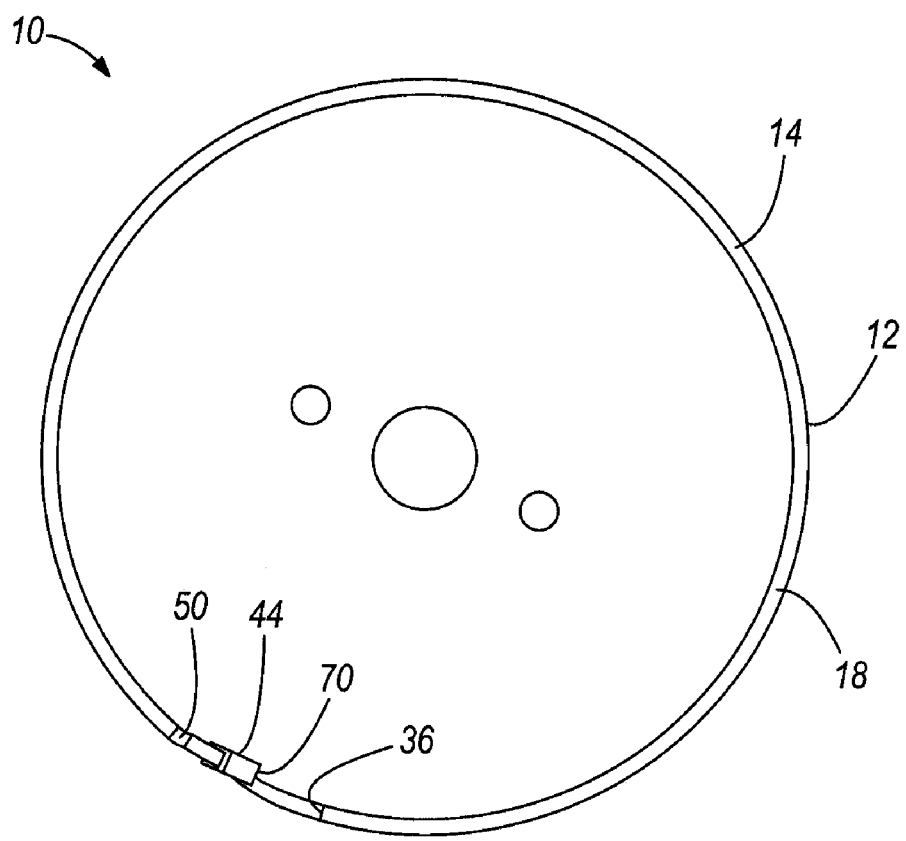
FIG. 6 is a front view of the cutting tool shown in FIG. 1 with a blade and a flexible outer wall in a radially inward position.
Figure 7:
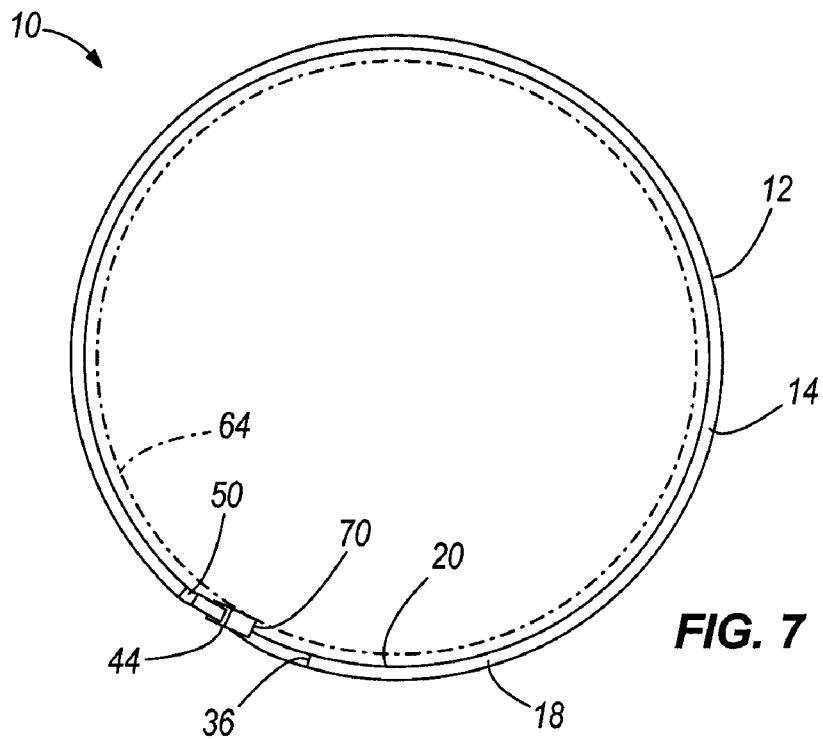
FIG. 7 is a front view of the cutting tool shown in FIG. 1 and showing a schematic representation of a path of a blade through a workpiece.

As shown in FIG. 5, the adjacent gullet 36 can define a leading edge 56 of the moveable wall 54. In the illustrated embodiment of FIGS. 1-7, one moveable wall 54 is supported adjacent to the gullet 36. In other embodiments, the cutting tool 10 can include two, three, four or more moveable walls 54 and two, three, four or more slots 50 can be arranged around the circumference of the cutting tool 10 at regular or irregular intervals in proximity to the gullets 36 or spaced a distance from the gullets 36.

While reference is made herein to a slot 50 formed in the tool body 12, it should be understood that the slot 50 and the moveable wall 54 of the present invention can be formed in a number of different manners. For example, one or more of the slots 50 can be cut in the tool body 12 to form an adjacent moveable wall 54. Alternatively or in addition, recesses can be formed in the tool body 12 and elongated sections of material can be secured (e.g., welded, soldered, brazed, etc.) to the tool body 12 in the recesses to form or at least partially form a moveable wall 54 and/or an adjacent slot 50. In some such embodiments, the tool body 12 and the moveable wall 54 can be formed from different materials. Additionally, the moveable walls 54 can be formed from a material having a greater elasticity than the tool body 12.

As shown in FIGS. 3-7, the cutting edges 70 of one or more of the blades 44 can be contoured such that, during operation, the blade 44 and the moveable wall 54 to which the blade 44 is secured move radially inwardly through the workpiece as the cutting tool 10 moves axially through the workpiece.

During operation, an operator secures the connecting structure 22 of the cutting tool 10 to a power tool and positions the cutting tool 10 above a workpiece. The operator then centers the bit 30 above the intended cutting location and activates the power tool to rotate the cutting tool 10 about the axis 32 of the drive shaft 24. As the cutting tool 10 rotates, the bit 30 drills a locating hole in the workpiece and orients the body 12 of the cutting tool 10 in a desired position above the workpiece.

Continued forward movement of the cutting tool 10 moves the blade 44 into engagement with the workpiece. As the blade 44 rotates, the blade 44 cuts a circular cutting path 64 in the workpiece. Chips and sawdust formed during cutting are directed radially outwardly through the gullet 36 and away from the body 12.

In the embodiment of FIGS. 1-7, the cutting edge 70 is configured such that when the tool body 12 is rotated about the axis 32 and driven into the workpiece, the forces associated with cutting the workpiece applied to the cutting edge 70 are sufficient to cause the blade 44 and moveable wall 54 to elastically flex radially inward. This inward radial movement of the moveable wall 54 and its associated blade 44 cause the outside diameter or perimeter of the plug 11 to be smaller than the inner diameter of the first end 14 of the tool body 12.

Once the cutting edge 70 has passed completely through the workpiece, the cutting operation is complete and the force is removed from the cutting edge 70, allowing the moveable wall 54 to flex radially outwardly toward a radially outer position. As the cutting tool 10 is removed from the workpiece, the workpiece plug 1, which has a smaller outer diameter or perimeter than the inner diameter of the first end 14 of the tool body 12 with the moveable wall 54 in the radially outer position, falls away from the cutting tool 10.

Figure 8:
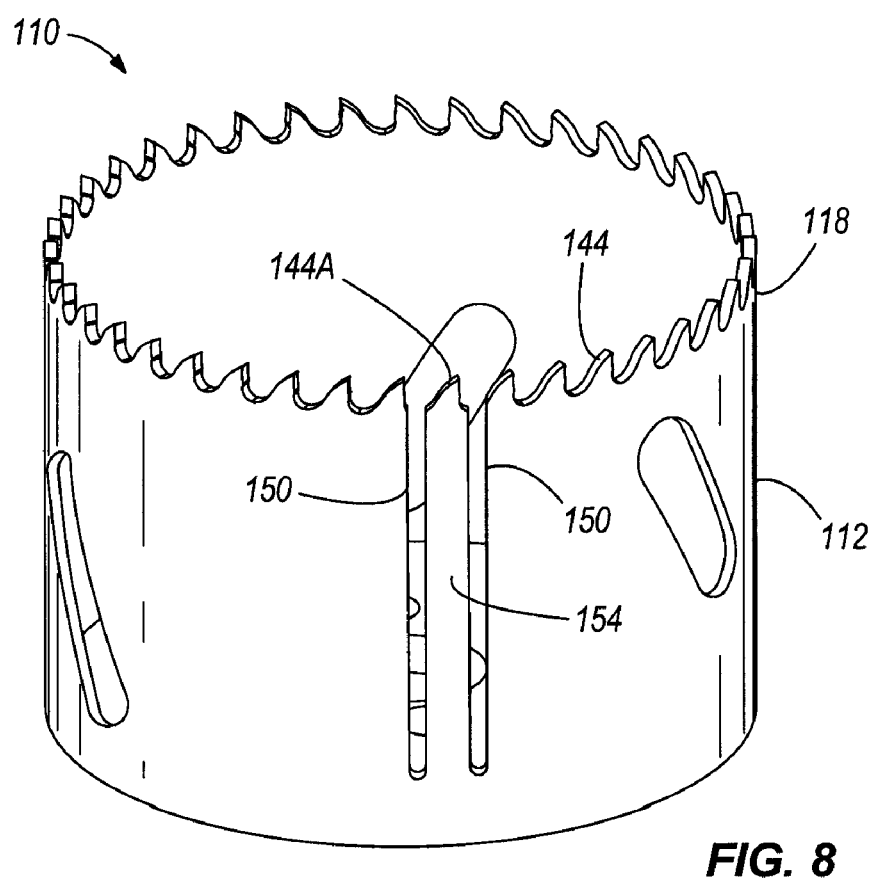
FIG. 8 is a perspective view of an alternative embodiment of the cutting tool of the present invention.

FIG. 8 illustrates an alternate embodiment of a cutting tool 110 according to the present invention. The cutting tool 110 shown in FIG. 8 is similar in many ways to the illustrated embodiment of FIGS. 1-7 described above. Accordingly, with the exception of mutually inconsistent features and elements between the embodiment of FIGS. 1-7 and the embodiment of FIG. 8, reference is hereby made to the description above accompanying the embodiment of FIGS. 1-7 for a more complete description of the features and elements (and the alternatives to the features and elements) of the embodiment of FIGS. 1-7. Features and elements in the embodiments of FIG. 8 corresponding to features and elements in the embodiment of FIGS. 1-7 are numbered in the 100 series.

In the embodiment of FIG. 8, a number of blades 144 are spaced circumferentially around the rim 118 of the tool body 112 and a pair of spaced apart slots or openings 150 extends through the rim 118 and the tool body 112 in a direction substantially parallel to the longitudinal axis 132, forming a moveable portion or wall 154. In some embodiments, such as the illustrated embodiment of FIG. 8, a blade 144A can be supported on an outer end of the moveable wall 154, and the blade 144A can be substantially similar in shape, size, and configuration to the blades 144 spaced around the rim 118 of the body 112. In other embodiments, two or more blades 144A can be supported on the moveable wall 154, and one or more of the blades 144A can have a different size, shape, or configuration than the other blades 144 spaced around the rim 118.

During operation, as the tool body 112 is rotated about the axis 132 and driven into the workpiece, the moveable wall 154 and the blade 144A supported on the moveable wall 154 move radially inward toward the axis 132. This radially inward movement of the blade 144A causes the blade 144A to cut a plug 11 from the workpiece having an outer diameter or perimeter which is substantially smaller than an inner diameter of the rim 118 of the cutting tool 110. Once the blade 144A has exited the workpiece, the moveable wall 154 moves radially outwardly and returns to a radially outer position so that the plug 11 can be removed from the cutting tool body 112.

Figure 9:
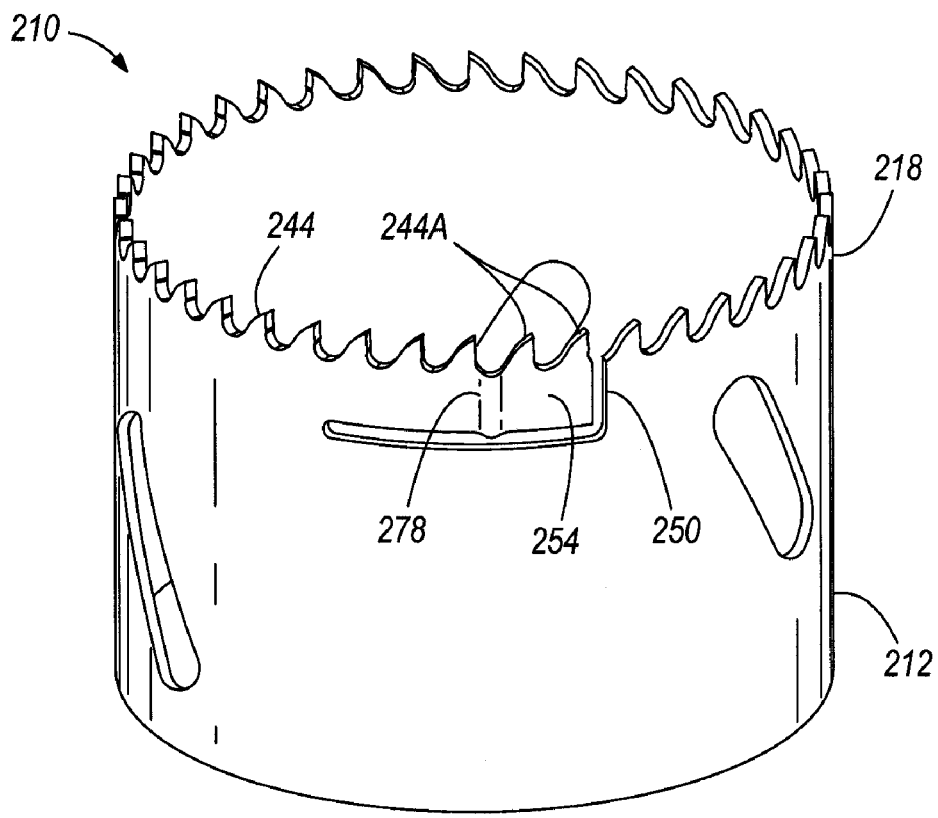
FIG. 9 is a perspective view of another alternative embodiment of the cutting tool of the present invention.
Figure 10:
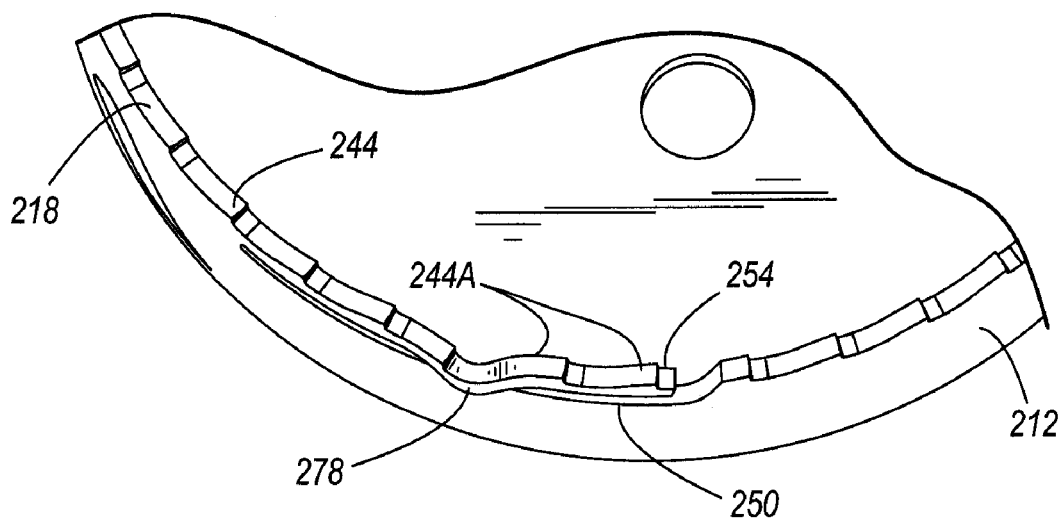
FIG. 10 is an enlarged front perspective view of a portion of the cutting tool shown in FIG. 9.

FIGS. 9 and 10 illustrate another alternate embodiment of a cutting tool 210 according to the present invention. The cutting tool 210 shown in FIGS. 9 and 10 is similar in many ways to the illustrated embodiments of FIGS. 1-8 described above. Accordingly, with the exception of mutually inconsistent features and elements between the embodiments of FIGS. 1-8 and the embodiment of FIGS. 9 and 10, reference is hereby made to the description above accompanying the embodiments of FIGS. 1-8 for a more complete description of the features and elements (and the alternatives to the features and elements) of the embodiments of FIGS. 1-8. Features and elements in the embodiments of FIGS. 9 and 10 corresponding to features and elements in the embodiment of FIGS. 1-8 are numbered in the 200 series.

In the embodiment of FIGS. 9 and 10, the cutting tool 210 includes a slot or opening 250 which opens through the rim 218 and extends axially a short distance before turning and extending circumferentially in a clockwise direction (from the perspective shown in FIGS. 9 and 10) through the cutting tool body 212. The slot 250 at least partially defines a moveable portion or wall 254, which supports a number of blades 244A for radial movement with the moveable wall 254 relative to the rim 218. As shown in FIGS. 9 and 10, a protrusion 278 extends outwardly from an exterior side of the moveable wall 254.

During operation of the cutting tool 210, blades 244 spaced circumferentially around the rim 218 of the cutting tool body 212 move through a workpiece forming a cutting path. As the cutting tool 210 continues to move through the workpiece, the protrusion 278 contacts an interior edge of the workpiece along the cutting path, causing the moveable wall 254 to move radially inwardly. This inward movement of the moveable wall 254 causes the blades 244A supported on the moveable wall 254 to cut radially inwardly into the cutting path, thereby widening the cutting path in a radial direction. Once the cutting operation is complete, the cutting tool 210 is moved away from the workpiece and the moveable wall 254 moves radially outwardly toward a radially outer position. In this manner, the cutting tool 210 cuts a plug 11 having an exterior diameter which is substantially less than an interior diameter of the cutting tool body 212.

Figure 11:
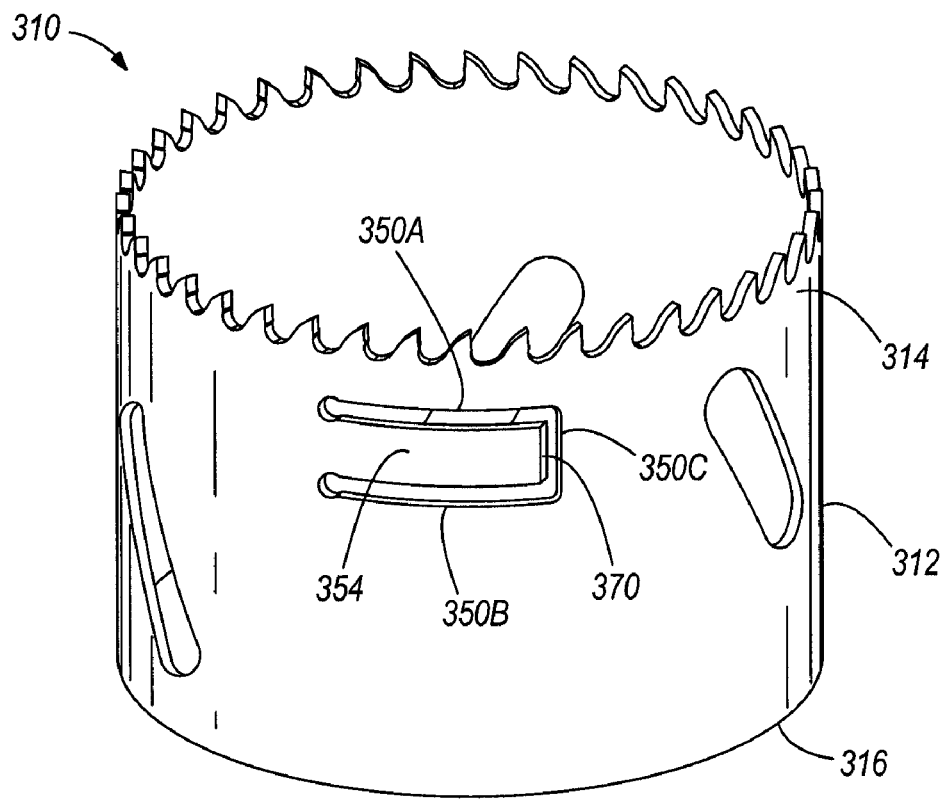
FIG. 11 is a perspective view of yet another alternative embodiment of the cutting tool of the present invention.
Figure 12:
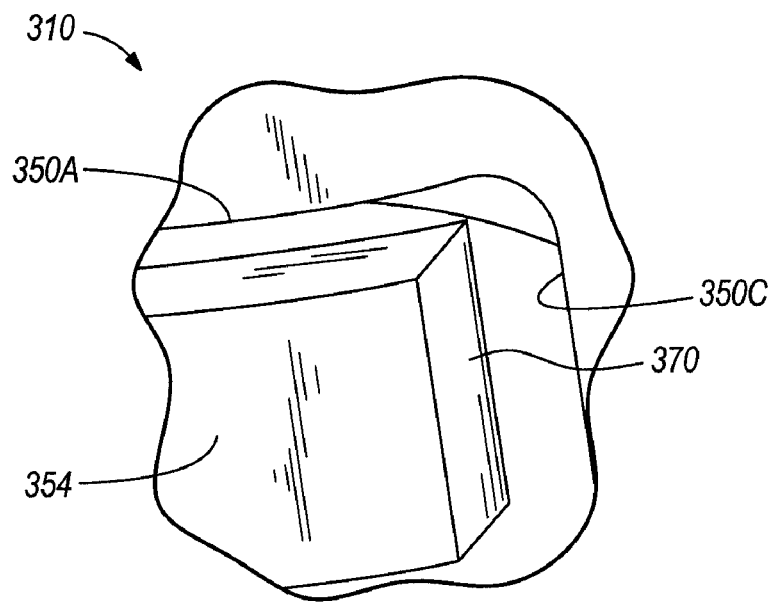
FIG. 12 is an enlarged perspective view of a portion of the cutting tool shown in FIG. 11.

FIGS. 11 and 12 illustrate another alternate embodiment of a cutting tool 310 according to the present invention. The cutting tool 310 shown in FIGS. 11 and 12 is similar in many ways to the illustrated embodiments of FIGS. 1-10 described above. Accordingly, with the exception of mutually inconsistent features and elements between the embodiments of FIGS. 1-10 and the embodiment of FIGS. 11 and 12, reference is hereby made to the description above accompanying the embodiments of FIGS. 1-10 for a more complete description of the features and elements (and the alternatives to the features and elements) of the embodiments of FIGS. 1-10. Features and elements in the embodiment of FIGS. 11 and 12 corresponding to features and elements in the embodiments of FIGS. 1-10 are numbered in the 300 series.

In the embodiment of FIGS. 11 and 12, two parallel slots or openings 350A, 350B extending circumferentially around the tool body 312 between the first and second ends 314, 316 and an axial slot 350C extending through the cutting tool body 312 between the two circumferential slots 350A, 350B at least partially define a moveable portion or wall 354. A cutting edge 370 can be formed on a leading edge of the moveable wall 354.

In some embodiments, such as the illustrated embodiment of FIGS. 11 and 12, the moveable wall 354 can be biased radially inwardly toward an interior of the cutting tool body 312 so that, during cutting, the cutting edge 370 is moved radially inwardly and into engagement with an exterior surface of a plug 11 being cut from the workpiece by the cutting tool 310. This inward movement of the cutting edge 370 causes the outer diameter of the plug 311 to be smaller than the inside diameter of the cutting tool body 312. Once the blade 344 has exited the workpiece, the moveable wall 354 returns to its radially outer position and the workpiece plug 11 falls away from the cutting tool 310.

Figure 13:
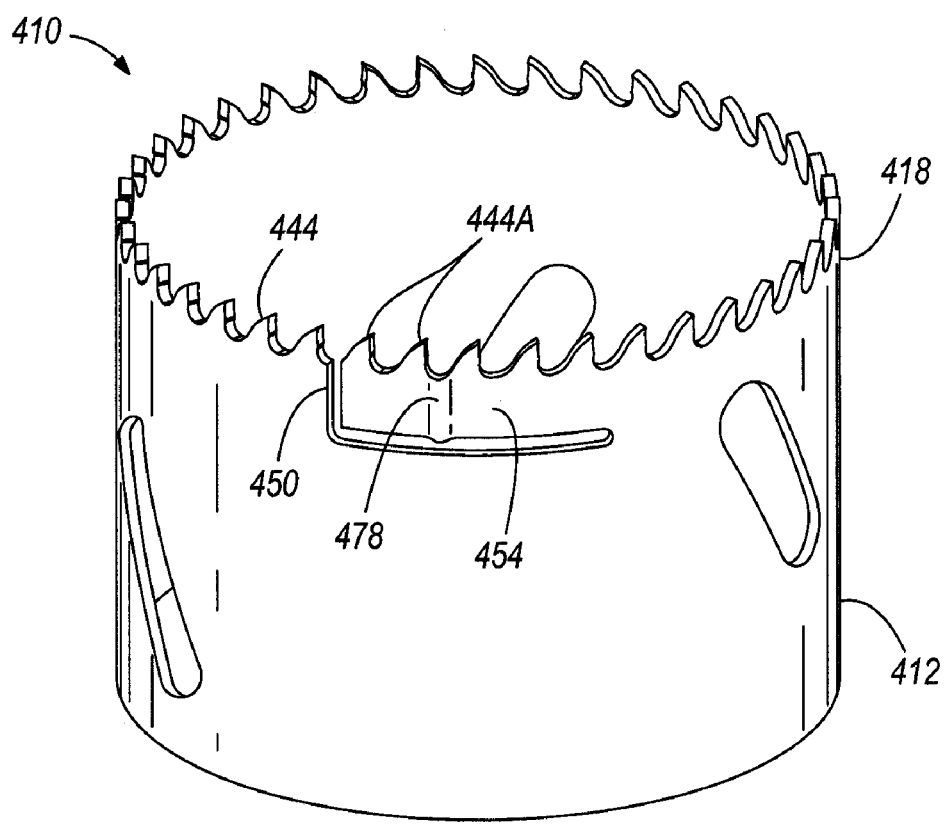
FIG. 13 is a perspective view of yet another alternative embodiment of the cutting tool of the present invention.
Figure 14:
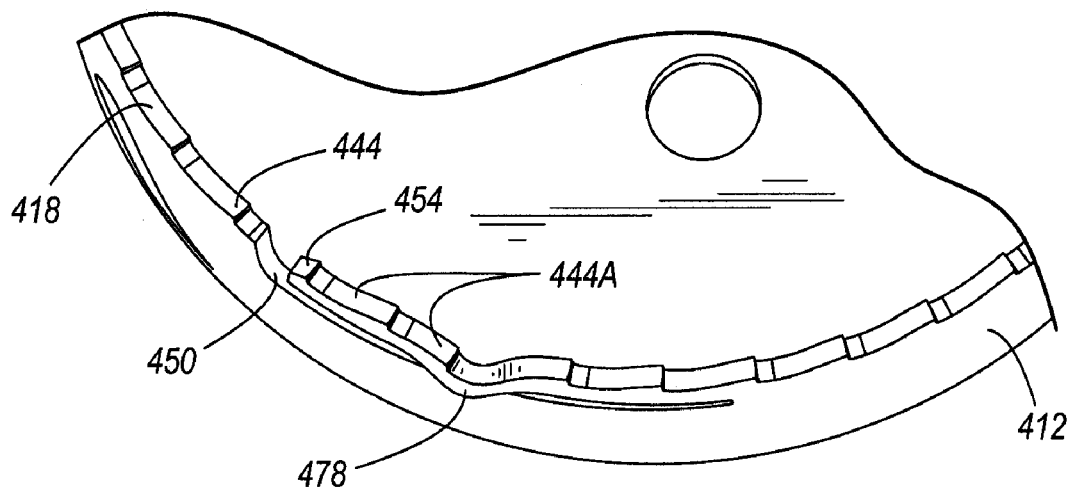
FIG. 14. is an enlarged perspective view of a portion of the cutting tool shown in FIG. 13.

FIGS. 13 and 14 illustrate another alternate embodiment of a cutting tool 410 according to the present invention. The cutting tool 410 shown in FIGS. 13 and 14 is similar in many ways to the illustrated embodiments of FIGS. 1-12 described above. Accordingly, with the exception of mutually inconsistent features and elements between the embodiments of FIGS. 1-12 and the embodiment of FIGS. 13 and 14, reference is hereby made to the description above accompanying the embodiments of FIGS. 1-12 for a more complete description of the features and elements (and the alternatives to the features and elements) of the embodiments of FIGS. 1-12. Features and elements in the embodiments of FIGS. 13 and 14 corresponding to features and elements in the embodiment of FIGS. 1-8 are numbered in the 400 series.

In the embodiment of FIGS. 13 and 14, the cutting tool 410 includes a slot or opening 450 which opens through the rim 418 and extends axially a short distance before turning circumferentially in a counter-clockwise direction (from the perspective shown in FIGS. 13 and 14) through the cutting tool body 412. The slot 450 at least partially defines a moveable portion or wall 454, which supports a number of blades 444A for radial movement with the moveable wall 454 relative to the rim 418. As shown in FIGS. 13 and 14, a protrusion 478 extends outwardly from an exterior side of the moveable wall 454.

During operation of the cutting tool 410, blades 444 spaced circumferentially around the rim 418 of the cutting tool body 412 move through a workpiece forming a cutting path. As the cutting tool 410 continues to move through the workpiece, the protrusion 478 contacts an interior edge of the workpiece along the cutting path, causing the moveable wall 454 to move radially inwardly. This inward movement of the moveable wall 454 causes the blades 444A supported on the moveable wall 454 to cut radially inwardly into the cutting path, thereby widening the cutting path in a radial direction. Once the cutting operation is complete, the cutting tool 410 is moved away from the workpiece and the moveable wall 454 moves radially outwardly toward a radially outer position. In this manner, the cutting tool 410 cuts a plug 11 having an exterior diameter which is substantially less than an interior diameter of the cutting tool body 412.

The embodiments described above and illustrated in the figures are presented by way of example only and are not intended as a limitation up on the concepts and principles of the present invention.

What is claimed is:

1. A cutting tool for cutting a workpiece, the cutting tool comprising:
   a tool body having a first end and a second end and defining an axis extending through the first and second ends;
   a rim extending circumferentially around the first end of the tool body; and
   a blade having a base supported on the tool body for movement relative to the rim,
   wherein the blade is configured to automatically move radially inward with respect to at least a portion of the rim during rotation of the tool body about the axis, and wherein the blade is configured to automatically move radially outward with respect to the portion of the rim when rotation of the tool body about the axis stops.

2. The cutting tool of claim 1, wherein the second end of the tool body includes a drive shaft engageable in a chuck of a power tool for rotation about the axis with a spindle of the power tool relative to the workpiece.

3. The cutting tool of claim 1, wherein the base of the blade is moveable radially relative to the portion of the rim to adjust a cutting path defined by the blade.

4. The cutting tool of claim 1, wherein a first portion of the tool body is moveable with the blade relative to a second portion of the tool body.

5. The cutting tool of claim 4, wherein the first portion is flexibly secured to the second portion.

6. The cutting tool of claim 4, wherein the tool body includes a pair of openings extending through the rim on opposite sides of the blade to at least partially define the first portion of the tool body.

7. The cutting tool of claim 1, wherein the portion of the rim is a first portion of the rim, wherein the tool body includes an opening extending through the tool body in a direction generally parallel to the rim to at least partially define a second portion of the rim supporting the blade, the second portion of the rim being moveable relative the first portion of the rim.

8. The cutting tool of claim 1, wherein the blade is biased radially inwardly toward the axis.

9. The cutting tool of claim 1, wherein the portion of the rim is a first portion of the rim, the cutting tool further comprising a protrusion extending outwardly from a radially exterior side of the rim for selective engagement with the workpiece to bias a second portion of the rim supporting the blade radially inwardly relative to the first portion of the rim.

10. A cutting tool for cutting a workpiece, the cutting tool comprising:
    a tool body having a first end and a second end and defining an axis extending through the first and second ends;
    a rim extending circumferentially around the first end of the tool body;
    a first portion of the tool body being moveable radially relative to a second portion of the tool body; and
    a blade supported on the first portion for movement with the first portion to define a cutting path having a circumference smaller than a circumference of a cutting path of the second portion of the tool body,
    wherein the tool body includes a pair of openings extending through the tool body on opposite sides of the blade and generally parallel to the axis to at least partially separate the first portion from the second portion.

11. The cutting tool of claim 10, wherein the second end of the tool body includes a drive shaft engageable with a power tool for rotating motion about the axis relative to the workpiece.

12. The cutting tool of claim 10, wherein the first portion is flexibly secured to the second portion.

13. The cutting tool of claim 10, wherein the blade is biased radially inwardly toward the axis.

14. A method of cutting a workpiece with a cutting tool, the cutting tool including a tool body, the method comprising the acts of:

positioning a rim extending circumferentially around an end of the tool body adjacent to the workpiece;

engaging a blade supported on the tool body with the workpiece;

rotating the cutting tool to cut the workpiece;

automatically moving the blade radially inward with respect to at least a portion of the rim during rotation of the cutting tool; and automatically moving the blade radially outward with respect to the portion of the rim when rotation of the cutting tool stops.

15. The method of claim 14, wherein the end of the tool body is a first end, further comprising engaging a second end of the cutting tool with a power tool, and wherein rotating the cutting tool includes operating a motor of the power tool to rotate the cutting tool about an axis extending between the first and second ends relative to the workpiece.

16. The method of claim 14, wherein the blade is supported on a first portion of the tool body, and wherein automatically moving the blade radiallly inward includes moving the blade relative to a second portion of the tool body such that the blade is moveable along a first cutting path and the second portion is moveable along a second cutting path, which is concentric to and has a greater cutting distance than the first cutting path.

17. The method of claim 14, wherein the end of the tool body is a first end, the tool body includes a second end spaced apart from the first end and an axis extending through the tool body between the first and second ends, and further comprising engaging the workpiece with a radially outwardly extending protrusion causing the blade to move radially inwardly.

18. The method of claim 14, wherein rotating the cutting tool to cut the workpiece includes cutting a plug from the workpiece.

19. The method of claim 18, wherein automatically moving the blade radially inward includes moving the blade radially inwardly relative to the rim such that an outer perimeter of the plug is spaced away from an inner diameter of the rim.

20. The method of claim 14, further comprising adjusting a cutting path defined by automatically the rim by moving the blade radially inward with respect to at least a portion of the rim.

21. A method of cutting a workpiece with a cutting tool, the cutting tool including a tool body having a first end and a second end and defining an axis extending through the first end and second end, the method comprising the acts of:

positioning a rim extending circumferentially around the first end of the tool body adjacent to the workpiece;

engaging a blade supported on the tool body with the workpiece;

driving the cutting tool into the workpiece to cut a plug from the workpiece;

automatically moving the blade and a first portion of the tool body radially inward relative to a second portion of the tool body in response to driving the cutting tool into the workpiece; and automatically moving the blade and the first portion of the tool body radially outwardly relative to the second portion of the tool body.

22. The method of claim 21, further comprising removing the plug from the first end of the cutting tool after the blade and the first portion of the rim have been moved radially outwardly.

23. The method of claim 21, wherein the plug is cut along a first cutting path by the blade and a second path by the rim, and wherein the second path has a greater travel distance than the first cutting path.

24. The method of claim 21, further comprising removing the plug from the first end of the cutting tool by cutting the plug with the blade to separate at least a portion of the plug from the rim of the cutting tool.

25. The method of claim 21, further comprising engaging the workpiece with a radially outwardly extending protrusion causing the blade to move radially inwardly; and disengaging the plug from the radially outwardly extending protrusion causing the blade to move radially outwardly.

26. The method of claim 21, further comprising stopping cutting of the workpiece, causing the first portion supporting the blade to move radially outwardly relative to the rim.

27. The cutting tool of claim 1, wherein the blade includes a contour configured to automatically move the blade radially inward with respect to the portion of the rim during rotation of the tool body about the axis.

28. A cutting tool for cutting a workpiece, the cutting tool comprising:

a tool body having a first end and a second end and defining an axis extending through the first and second ends;

a rim extending circumferentially around the first end of the tool body;

a first portion of the tool body being moveable radially relative to a second portion of the tool body; and a blade supported on the first portion for movement with the first portion to define a cutting path having a circumference smaller than a circumference of a cutting path of the second portion of the tool body, wherein the tool body includes a pair of openings extending through the tool body in a direction generally parallel to the rim to at least partially define the first portion including the blade, the first portion being moveable relative the tool body.

29. A cutting tool for cutting a workpiece, the cutting tool comprising:

a tool body having a first end and a second end and defining an axis extending through the first and second ends;

a rim extending circumferentially around the first end of the tool body;

a first portion of the tool body being moveable radially relative to a second portion of the tool body; and a blade supported on the first portion for movement with the first portion to define a cutting path having a circumference smaller than a circumference of a cutting path of the second portion of the tool body, wherein the tool body includes an opening extending through the tool body in a direction generally parallel to the rim to at least partially separate the first portion from the second portion.

30. A cutting tool for cutting a workpiece, the cutting tool comprising:

a tool body having a first end and a second end and defining an axis extending through the first and second ends;

a rim extending circumferentially around the first end of the tool body;

a first portion of the tool body being moveable radially relative to a second portion of the tool body;

a blade supported on the first portion for movement with the first portion to define a cutting path having a circumference smaller than a circumference of a cutting path of the second portion of the tool body; and a protrusion extending outwardly from a radially exterior side of the tool body for selective engagement with the workpiece to bias the first portion of the tool body supporting the blade radially inwardly relative to the second portion of the tool body.

\* \* \* \* \*